US010602543B2

(12) United States Patent
Sun et al.

(10) Patent No.: US 10,602,543 B2
(45) Date of Patent: Mar. 24, 2020

(54) ASYNCHRONOUS CHANNEL RESERVATION DESIGN WITH PARTIAL SYMBOL ALIGNMENT

(71) Applicant: QUALCOMM Incorporated, San Diego, CA (US)

(72) Inventors: Jing Sun, San Diego, CA (US); Xiaoxia Zhang, San Diego, CA (US); Taesang Yoo, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/950,418

(22) Filed: Apr. 11, 2018

(65) Prior Publication Data

US 2018/0376503 A1 Dec. 27, 2018

Related U.S. Application Data

(60) Provisional application No. 62/524,253, filed on Jun. 23, 2017.

(51) Int. Cl.
*H04W 74/08* (2009.01)
*H04W 72/04* (2009.01)
(Continued)

(52) U.S. Cl.
CPC ..... *H04W 74/0808* (2013.01); *H04L 27/2605* (2013.01); *H04L 27/2607* (2013.01);
(Continued)

(58) Field of Classification Search
CPC ......... H04W 72/0406; H04W 72/0486; H04W 16/14; H04L 24/2607; H04L 27/2605; H04L 27/2666; H04L 27/2646
See application file for complete search history.

(56) References Cited

U.S. PATENT DOCUMENTS 9,992,787 B2 * 6/2018 Suzuki .................. H04W 16/14
2015/0271847 A1 * 9/2015 Luo ......................... H04L 5/003
370/329

(Continued)

FOREIGN PATENT DOCUMENTS

WO WO-2016160528 A1 10/2016

OTHER PUBLICATIONS

International Search Report and Written Opinion—PCT/US2018/038578—ISA/EPO—dated Sep. 12, 2018.

*Primary Examiner* — Ajay Cattungal
(74) *Attorney, Agent, or Firm* — Liem T. Do

(57) ABSTRACT

An asynchronous channel reservation design is disclosed having a partial symbol alignment. The transmitting node performs a listen before talk (LBT) procedure on a transmission channel shared by one or more transmission/reception points (TRPs). Upon detecting passing the LBT, a preamble is transmitted followed by a dynamic length cyclic prefix that includes the normal cyclic prefix plus an additional variable period. The transmitter then transmits the channel reservation message after the dynamic length cyclic prefix. On the detector side, once the preamble is detected, the detecting node assumes a normal cyclic prefix before attempting to detect and decode the channel reservation information in the message. Using a demodulation reference signal (DMRS) in the channel reservation message, the detecting node may detect the channel reservation message information from the shifted version of the detected message.

14 Claims, 11 Drawing Sheets

(51) Int. Cl.
*H04L 27/26* (2006.01)
*H04W 16/14* (2009.01)

(52) U.S. Cl.
CPC ...... *H04L 27/2646* (2013.01); *H04L 27/2666* (2013.01); *H04W 16/14* (2013.01); *H04W 72/0406* (2013.01); *H04W 72/0486* (2013.01)

(56) References Cited

U.S. PATENT DOCUMENTS

| | | | |
|---|---|---|---|
| 2016/0142192 A1* | 5/2016 | Damnjanovic ... | H04W 74/0816 370/329 |
| 2018/0027418 A1* | 1/2018 | Li .................. | H04W 16/14 370/329 |
| 2018/0220410 A1* | 8/2018 | Baghel ............ | H04W 72/0406 |
| 2018/0220428 A1* | 8/2018 | Sun ................ | H04W 74/02 |
| 2018/0332620 A1* | 11/2018 | Malladi ........... | H04W 74/0816 |
| 2019/0059085 A1* | 2/2019 | Sun ................ | H04L 27/0006 |
| 2019/0313432 A1* | 10/2019 | Belghoul ......... | H04W 72/1278 |

* cited by examiner

ASYNCHRONOUS CHANNEL RESERVATION DESIGN WITH PARTIAL SYMBOL ALIGNMENT

CROSS-REFERENCE TO RELATED APPLICATIONS

This application claims the benefit of U.S. Provisional Patent Application No. 62/524,253, entitled, "ASYNCHRONOUS CHANNEL RESERVATION DESIGN WITH PARTIAL SYMBOL ALIGNMENT," filed on Jun. 23, 2017, which is expressly incorporated by reference herein in its entirety.

BACKGROUND

Field

Aspects of the present disclosure relate generally to wireless communication systems, and more particularly, to asynchronous channel reservation design with partial symbol alignment.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes performing, by a transmitter node, a listen before talk (LBT) procedure on a transmission channel shared by one or more synchronous or asynchronous network nodes, transmitting, by the transmitter node, a preamble in response to passing the LBT procedure, transmitting, by the transmitter node, a dynamic length cyclic prefix after the preamble, wherein the dynamic length cyclic prefix includes a normal cyclic prefix plus a dynamic period, and transmitting, by the transmitter node, a channel reservation message after the dynamic length cyclic prefix.

In an additional aspect of the disclosure, a method of wireless communication includes monitoring, by a network node, for a channel reservation preamble from one or more neighboring transmitters, assuming, by the network node, a normal cyclic prefix after the channel reservation preamble in response to detection of the channel reservation preamble, decoding, by the network node, a signal over a symbol length after the normal cyclic prefix, wherein the decoding the signal is to decode a channel reservation message.

In an additional aspect of the disclosure, an apparatus configured for wireless communication includes means for performing, by a transmitter node, a LBT procedure on a transmission channel shared by one or more synchronous or asynchronous network nodes, means for transmitting, by the transmitter node, a preamble in response to passing the LBT procedure, means for transmitting, by the transmitter node, a dynamic length cyclic prefix after the preamble, wherein the dynamic length cyclic prefix includes a normal cyclic prefix plus a dynamic period, and means for transmitting, by the transmitter node, a channel reservation message after the dynamic length cyclic prefix.

In an additional aspect of the disclosure, an apparatus configured for wireless communication includes means for monitoring, by a network node, for a channel reservation preamble from one or more neighboring transmitters, means for assuming, by the network node, a normal cyclic prefix after the channel reservation preamble in response to detection of the channel reservation preamble, means for decoding, by the network node, a signal over a symbol length after the normal cyclic prefix, wherein the means for decoding the signal is to decode a channel reservation message.

In an additional aspect of the disclosure, a non-transitory computer-readable medium having program code recorded thereon. The program code further includes code to perform, by a transmitter node, a LBT procedure on a transmission channel shared by one or more synchronous or asynchronous network nodes, code to transmit, by the transmitter node, a preamble in response to passing the LBT procedure, code to transmit, by the transmitter node, a dynamic length cyclic prefix after the preamble, wherein the dynamic length cyclic prefix includes a normal cyclic prefix plus a dynamic period, and code to transmit, by the transmitter node, a channel reservation message after the dynamic length cyclic prefix.

In an additional aspect of the disclosure, a non-transitory computer-readable medium having program code recorded thereon. The program code further includes code to monitor, by a network node, for a channel reservation preamble from one or more neighboring transmitters, code to assume, by the network node, a normal cyclic prefix after the channel reservation preamble in response to detection of the channel reservation preamble, code to decode, by the network node, a signal over a symbol length after the normal cyclic prefix, wherein the code to decode the signal is to decode a channel reservation message.

In an additional aspect of the disclosure, an apparatus configured for wireless communication is disclosed. The apparatus includes at least one processor, and a memory coupled to the processor. The processor is configured to perform, by a transmitter node, a LBT procedure on a transmission channel shared by one or more synchronous or asynchronous network nodes, to transmit, by the transmitter node, a preamble in response to passing the LBT procedure, to transmit, by the transmitter node, a dynamic length cyclic prefix after the preamble, wherein the dynamic length cyclic prefix includes a normal cyclic prefix plus a dynamic period, and to transmit, by the transmitter node, a channel reservation message after the dynamic length cyclic prefix.

In an additional aspect of the disclosure, an apparatus configured for wireless communication is disclosed. The apparatus includes at least one processor, and a memory coupled to the processor. The processor is configured to monitor, by a network node, for a channel reservation preamble from one or more neighboring transmitters, to assume, by the network node, a normal cyclic prefix after the channel reservation preamble in response to detection of the channel reservation preamble, to decode, by the network node, a signal over a symbol length after the normal cyclic prefix, wherein the configuration to decode the signal is to decode a channel reservation message.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
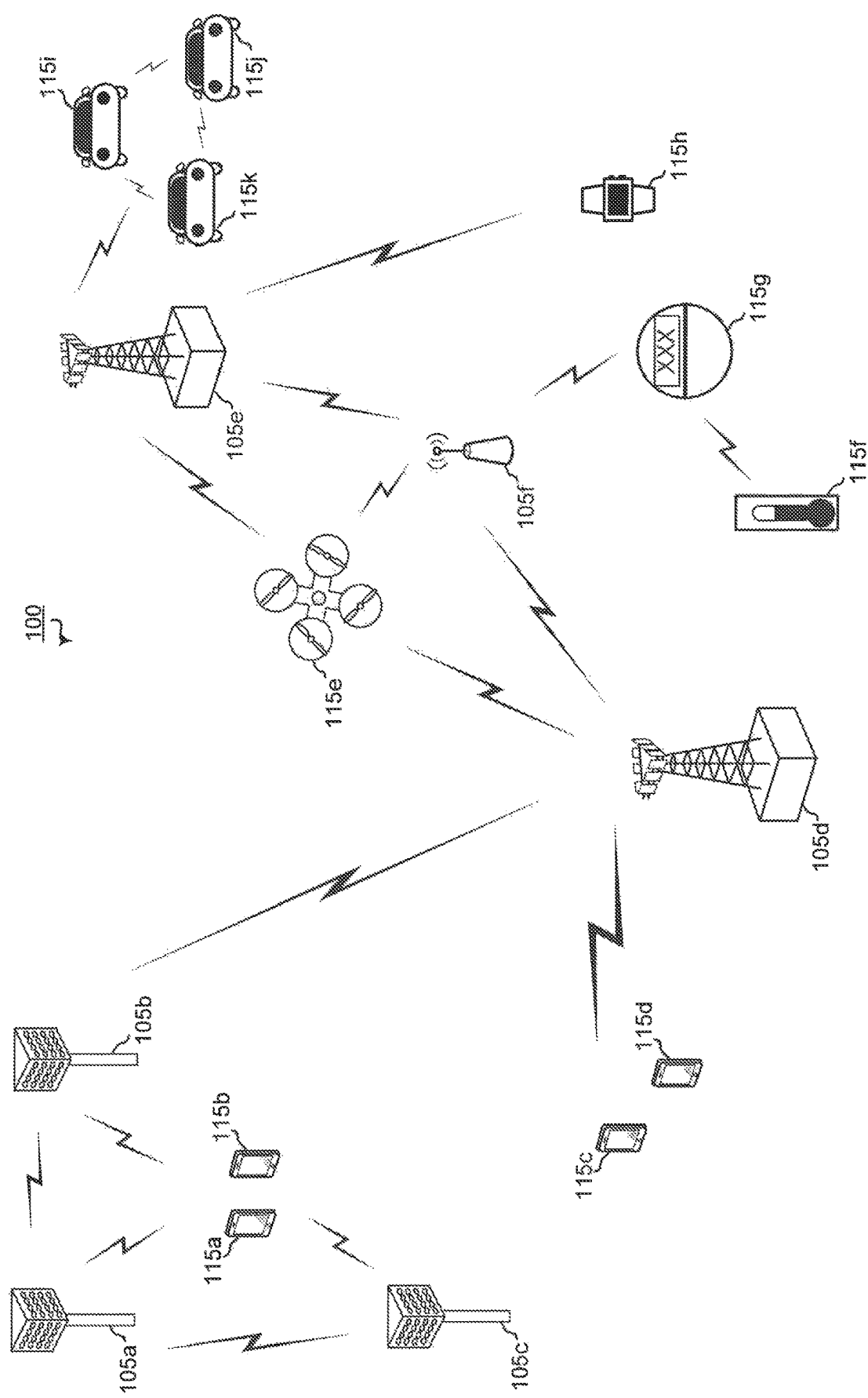
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
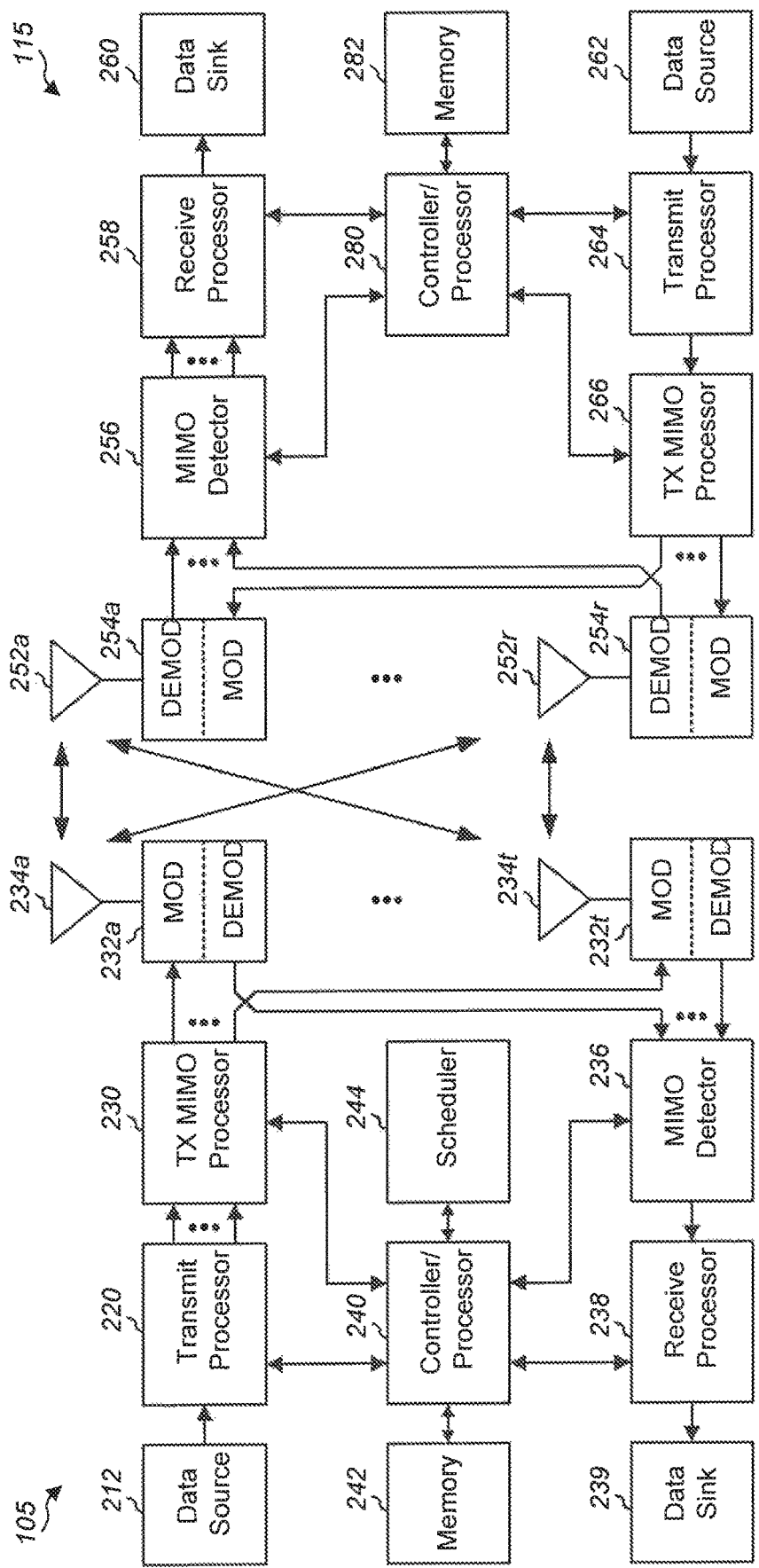
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254*a* through 254*r* (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 6A and 6B, and/or other processes for the techniques described herein. The memories 242 and 282 may store data and program codes for the base station 105 and the UE 115, respectively. A scheduler 244 may schedule UEs for data transmission on the downlink and/or uplink.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 115*g* is illustrated communicating with UE 115*f*. In some examples, UE 115*g* is functioning as a scheduling entity or a primary sidelink device, and UE 115*f* may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 115*i-k* may optionally communicate directly with one another in addition to communicating with base station 105*e*.

Unicast or broadcast transmissions of control information and/or traffic information from a base station (e.g., base station 105*a*) to one or more UEs (e.g., UEs 115*a* and 115*b*) may be referred to as downlink (DL) transmission, while transmissions of control information and/or traffic information originating at a UE (e.g., UE 115*c*) may be referred to as uplink (UL) transmissions. In addition, the uplink and/or downlink control information and/or traffic information may be time-divided into frames, subframes, slots, and/or symbols. As used herein, a symbol may refer to a unit of time that, in an OFDM waveform, carries one resource element (RE) per subcarrier. A slot may carry 7 or 14 OFDM symbols. A subframe may refer to a duration of 1 ms. Multiple subframes may be grouped together to form a single frame or radio frame. Of course, these definitions are not required, and any suitable scheme for organizing waveforms may be utilized, and various time divisions of the waveform may have any suitable duration.

Further, the air interface in 5G network 100 (FIG. 1) may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
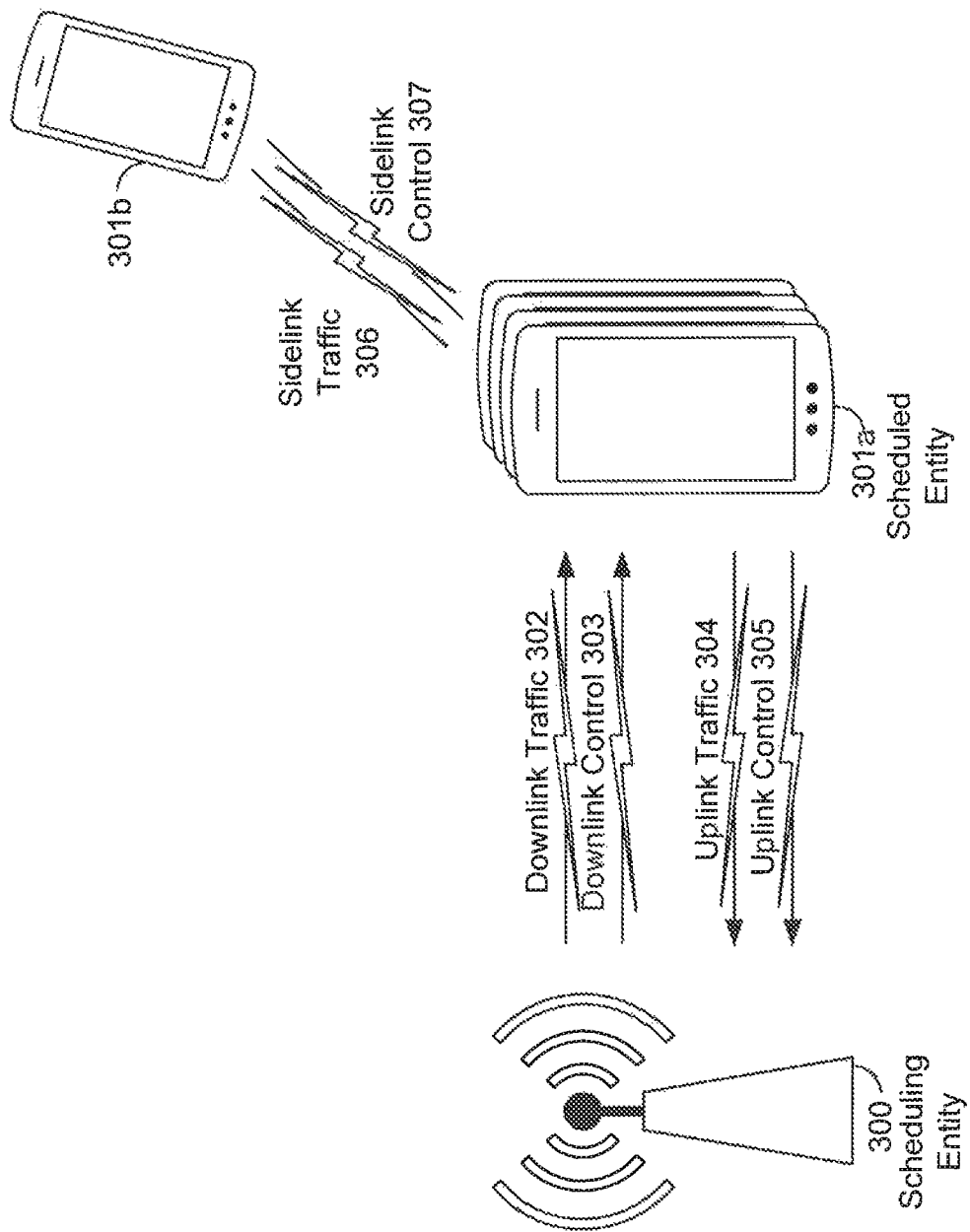
FIG. 3 is a block diagram illustrating an example of a hardware implementation for a scheduling entity employing a processing system according to some aspects of the disclosure.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 3, a block diagram illustrates a scheduling entity 300 and a plurality of scheduled entities 301 (e.g., 301*a* and 301*b*). Here, the scheduling entity 300 may correspond to a base station 105*x*. In additional examples, the scheduling entity 300 may correspond to a UE 115*a*, the quadcopter (UE 115*e*), or any other suitable node in the 5G network 100. Similarly, in various examples, the scheduled entity 301 may correspond to any of UEs 115*n*, or any other suitable node in 5G network 100 (FIG. 1).

As illustrated in FIG. 3, the scheduling entity 300 may broadcast traffic 302 to one or more scheduled entities 301 (the traffic may be referred to as downlink traffic). In accordance with certain aspects of the present disclosure, the term downlink may refer to a point-to-multipoint transmission originating at the scheduling entity 300. Broadly, the scheduling entity 300 is a node or device responsible for scheduling traffic in a wireless communication network, including the downlink transmissions and, in some examples, uplink traffic 310 from one or more scheduled entities to the scheduling entity 300. Another way to describe the system may be to use the term broadcast channel multiplexing. In accordance with aspects of the present disclosure, the term uplink may refer to a point-to-point transmission originating at a scheduled entity 301. Broadly, the scheduled entity 301 is a node or device that receives scheduling control information, including but not limited to scheduling grants, synchronization or timing information, or other control information from another entity in the wireless communication network such as the scheduling entity 300.

The scheduling entity 300 may broadcast control information 303 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 301. The PHICH carries HARQ feedback transmissions such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink traffic 304 and/or downlink traffic 302 including one or more traffic channels, such as a physical downlink shared channel (PDSCH) or a physical uplink shared channel (PUSCH) (and, in some examples, system information blocks (SIBs)), may additionally be transmitted between the scheduling entity 300 and the scheduled entity 301. Transmissions of the control and traffic information may be organized by subdividing a carrier, in time, into suitable transmission time intervals (TTIs).

Furthermore, the scheduled entities 301 may transmit uplink control information 305 including one or more uplink control channels to the scheduling entity 300. Uplink control information may include a variety of packet types and categories, including pilots, reference signals, and information configured to enable or assist in decoding uplink traffic transmissions. In some examples, the control information 305 may include a scheduling request (SR), i.e., request for the scheduling entity 300 to schedule uplink transmissions. Here, in response to the SR transmitted in the control information 305, the scheduling entity 200 may transmit downlink control information 303 that may schedule the TTI for uplink packet transmissions.

Uplink and downlink transmissions may generally utilize a suitable error correcting block code. In a typical block code, an information message or sequence is split up into blocks, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, and polar codes. Various implementations of scheduling entities 300 and scheduled entities 301 may include suitable hardware and capabilities (e.g., an encoder and/or decoder) to utilize any one or more of these error correcting codes for wireless communication.

In some examples, scheduled entities such as a first scheduled entity 301a and a second scheduled entity 301b may utilize sidelink signals for direct D2D communication. Sidelink signals may include sidelink traffic 306 and sidelink control 307. Sidelink control information 307 may include a request-to-send (RTS) channel and a clear-to-send (CTS) channel. The RTS may provide for a scheduled entity 301 to request a duration of time to keep a sidelink channel available for a sidelink signal; and the CTS may provide for the scheduled entity 301 to indicate the availability of the sidelink channel, e.g., for a requested duration of time. An exchange of RTS and CTS signals (e.g., handshake) may enable different scheduled entities performing sidelink communications to negotiate the availability of the sidelink channel prior to communication of the sidelink traffic information 306.

The channels or carriers illustrated in FIG. 3 are not necessarily all of the channels or carriers that may be utilized between a scheduling entity 300 and scheduled entities 301, and those of ordinary skill in the art will recognize that other channels or carriers may be utilized in addition to those illustrated, such as other traffic, control, and feedback channels.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 4:
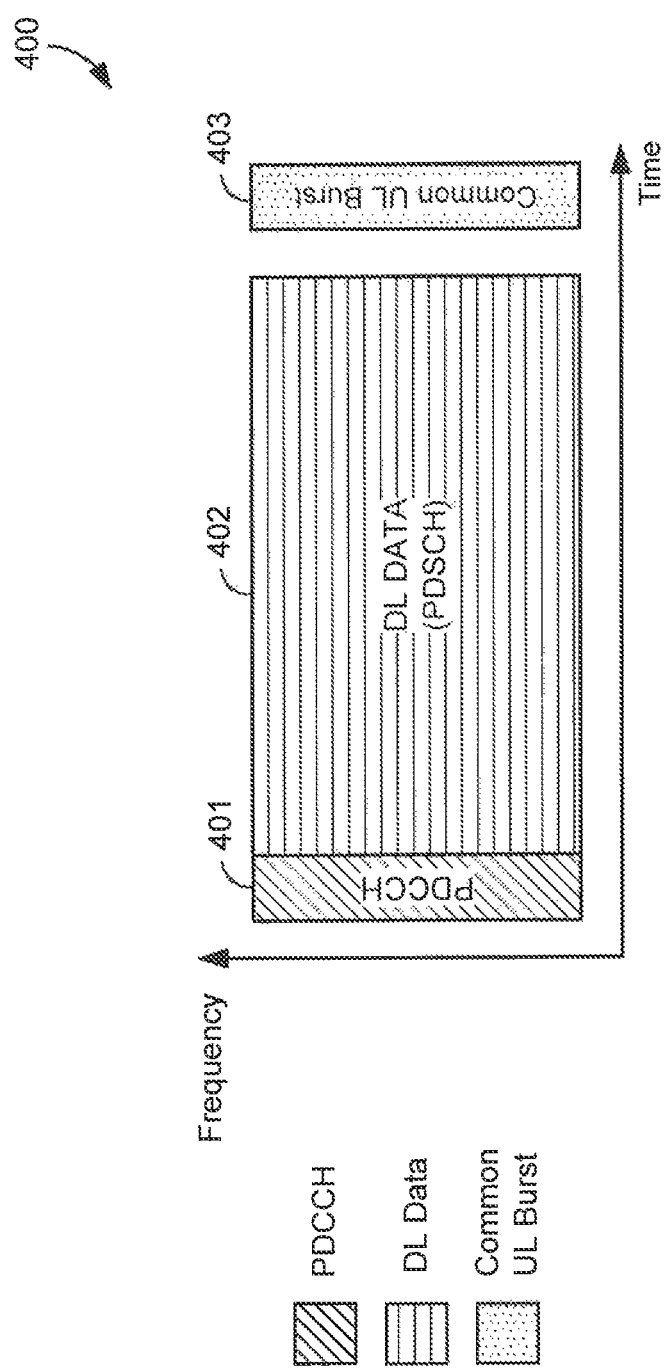
FIG. 4 is a diagram illustrating an example of a downlink centric slot according to some aspects of the disclosure.
Figure 5:
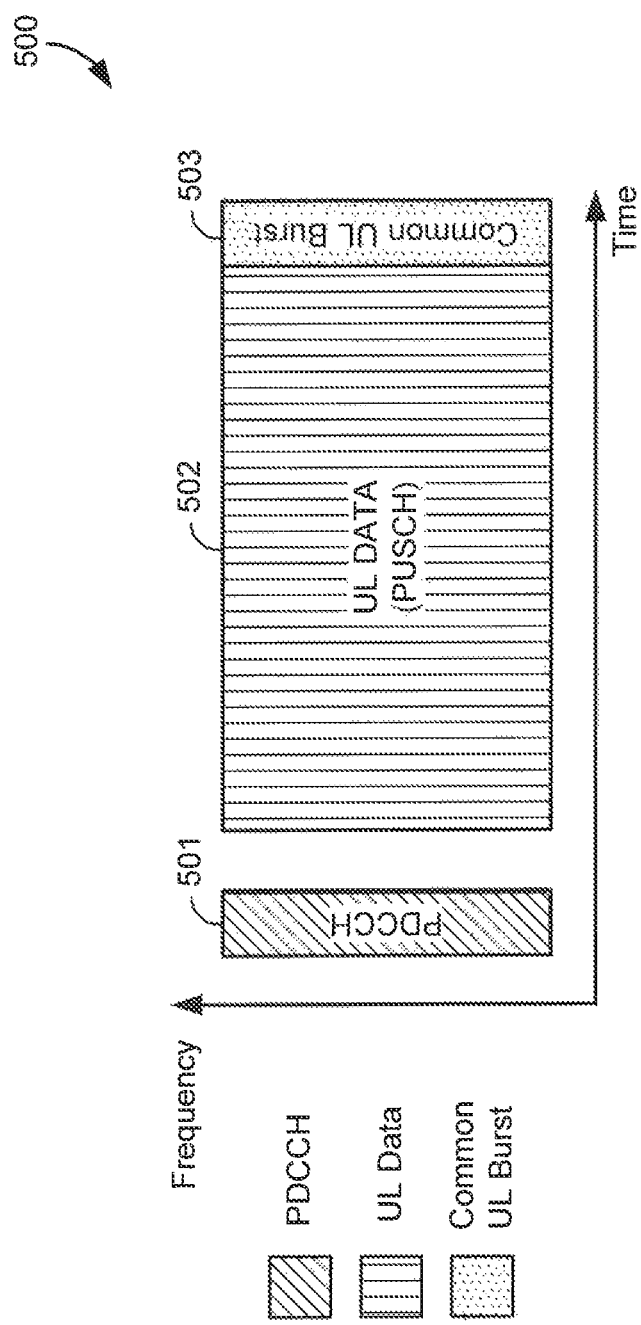
FIG. 5 is a diagram illustrating an example of an uplink centric slot according to some aspects of the disclosure.

FIGS. 4-5 are schematic diagrams that illustrate the structure of various slot formats according to a variety of aspects of this disclosure. As illustrated in FIG. 4, in each of these illustrations, the horizontal dimension represents time, and the vertical dimension represents frequency. Neither of these dimensions is intended to be accurate to scale, and are merely utilized as a scheme to illustrate characteristics of different waveforms over time as they may be configured in respective examples and embodiments. FIG. 4 is a diagram showing an example of a DL-centric slot 400. The DL-centric slot may include a control portion 401. The control portion 401 may exist in the initial or beginning portion of the DL-centric slot. The control portion 401 may include various scheduling information and/or control resources corresponding to various portions of the DL-centric slot. In some configurations, the control portion 401 may include a physical downlink control channel (PDCCH), as indicated in FIG. 4. The DL-centric slot may also include a downlink data portion 402. The downlink data portion 402 may sometimes be referred to as the payload of the DL-centric slot. The downlink data portion 402 may include the communication resources utilized to communicate downlink data from a scheduling entity 300 (e.g., eNB, gNB, base station) to a scheduled entity 301 (e.g., UE). In some configurations, the downlink data portion 402 may be a physical downlink shared channel (PDSCH).

The DL-centric slot may also include a common uplink burst 403. The common uplink burst 403 may sometimes be referred to as an uplink burst, a common uplink portion, and/or various other suitable terms. The common uplink burst 403 may include feedback information corresponding to various other portions of the DL-centric slot. For example, the common uplink burst 403 may include feedback information corresponding to the control portion 401. Non-limiting examples of feedback information may include an ACK signal, a NACK signal, a HARQ indicator, and/or various other suitable types of information. The common uplink burst 403 may include additional or alternative information, such as information pertaining to random access channel (RACH) procedures, scheduling requests (SRs), and various other suitable types of information. As illustrated in FIG. 4, the end of the downlink data portion 402 may be separated in time from the beginning of the common uplink burst 403. This time separation may sometimes be referred to as a gap, a guard period, a guard interval, and/or various other suitable terms. This separation provides time for the switch-over from downlink communication (e.g., reception operation by the scheduled entity 301 (e.g., UE)) to uplink communication (e.g., transmission by the scheduled entity 300 (e.g., UE)). One of ordinary skill in the art will understand that the foregoing is merely one example of a DL-centric subframe and alternative structures having similar features may exist without necessarily deviating from the aspects described herein.

FIG. 5 is a diagram showing an example of an UL-centric slot 500. The UL-centric slot may include a control portion 502. The control portion 502 may exist in the initial or beginning portion of the UL-centric slot. The control portion 502 in FIG. 5 may be similar to the control portion 502 described above with reference to FIG. 5. The UL-centric slot may also include an uplink data portion 504. The uplink data portion 504 may sometimes be referred to as the payload of the UL-centric slot. The uplink portion may refer to the communication resources utilized to communicate uplink data from the scheduled entity 204 (e.g., UE) to the scheduling entity 202 (e.g., eNB, gNB, base station). In some configurations, the control portion 502 may be a physical uplink shared channel (PUSCH).

As illustrated in FIG. 5, the end of the control portion 501 may be separated in time from the beginning of the uplink data portion 502. This time separation may sometimes be referred to as a gap, guard period, guard interval, and/or various other suitable terms. This separation provides time for the switch-over from downlink communication (e.g., reception operation by the scheduling entity 300 (e.g., UE)) to uplink communication (e.g., transmission by the scheduling entity 300 (e.g., UE)). The UL-centric slot may also include a common uplink burst 503. The common uplink burst 503 in FIG. 5 may be similar to the common uplink burst 403 described above with reference to FIG. 4. The common uplink burst 403 may include additional or alternative information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

With the increased shared use of available wireless spectrum, there may be locations where multiple network nodes (e.g., gNBs, transmission/reception points (TRPs), UEs, etc.) from various network operators may be sharing the spectrum. Channel reservation functionality may be difficult when attempting to manage such functionality with network nodes that may or may not be synchronized with each other. For example, different network node pairs or sets within one network operator may be unsynchronized between the pair or set, while being synchronized within the pair or sets. Moreover network node pairs or sets may be unsynchronized between different network operators. Channel reservation functionality may raise issues in an unlicensed system without synchronization across nodes—especially when the nodes belong to different network operators.

Aspects of the present disclosure are directed to a channel reservation signal design that supports the asynchronous operation of different systems. Proposed channel reservation procedures in NR systems include a preamble that may be a sequence-based design that supports a time domain cross-correlation-based detection. Typically, this preamble sequence may be a time domain sequence with a fixed or certain length. For the channel reservation messaging, the preamble may be used as a phase reference and may carry various reservation information (e.g., network allocation vector (NAV), headroom report, power, etc). The messaging occurs over an OFDM symbol.

Prior to transmitting the channel reservation messaging, a transmitter first performs a listen before talk (LBT) procedure, to ensure that the channel is not already occupied. Once the transmitter passes the LBT procedure, it may transmit the channel reservation waveform. Asynchronous transmission characteristics allows for early transmission of this signaling in order to occupy the channel as soon as possible. However, a potential problem arises in how to mix the channel reservation transmission with normal control/data transmissions. This may especially trigger an issue when the OFDM symbols between the different network nodes only partially align, which would trigger a possible time domain combination operation with tricky timing manipulation.

Various aspects of the present disclosure are directed to sending the preamble of the channel reservation in an asynchronous manner, while sending the OFDM channel reservation message portion of the channel reservation signaling in a synchronous manner at the OFDM symbol boundary. The channel reservation message may be transmitted over a single OFDM symbol. This asynchronous/synchronous transmission includes a dynamic length cyclic prefix of the channel reservation message sent between the preamble and message to accommodate for the OFDM symbol boundary. The described examples of the present disclosure may be presented in the context of transmitters and detectors. The transmitters are the network nodes (whether gNB, UE, etc.) that are attempting to transmit a signal to a destination. The detectors are the network nodes (whether gNB, UE, etc.) that are monitoring for use of the shared channel or shared spectrum.

Figures 6A, 6B:
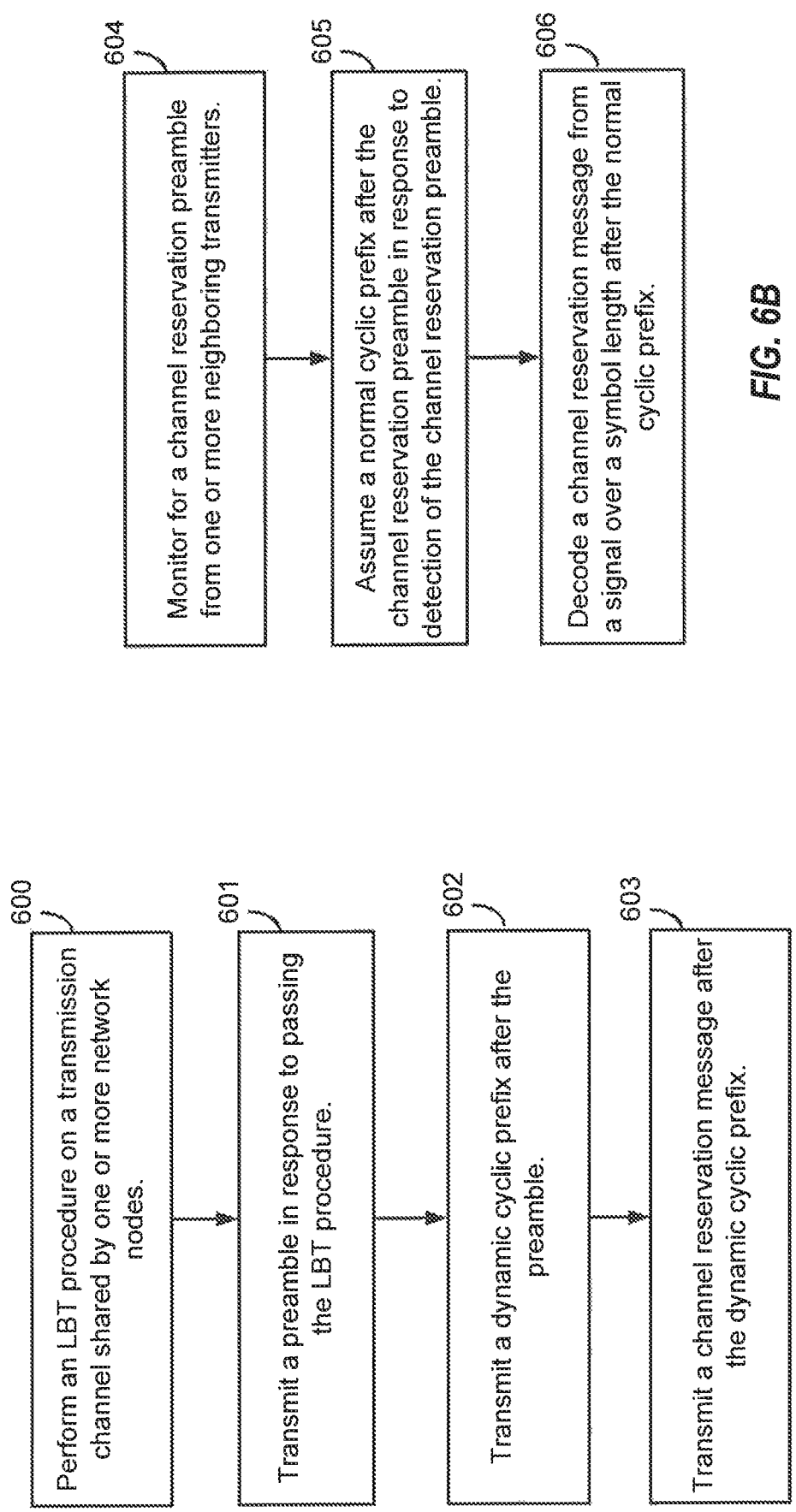
FIGS. 6A and 6B are block diagrams illustrating example blocks executed to implement aspects of the present disclosure.
Figure 10:
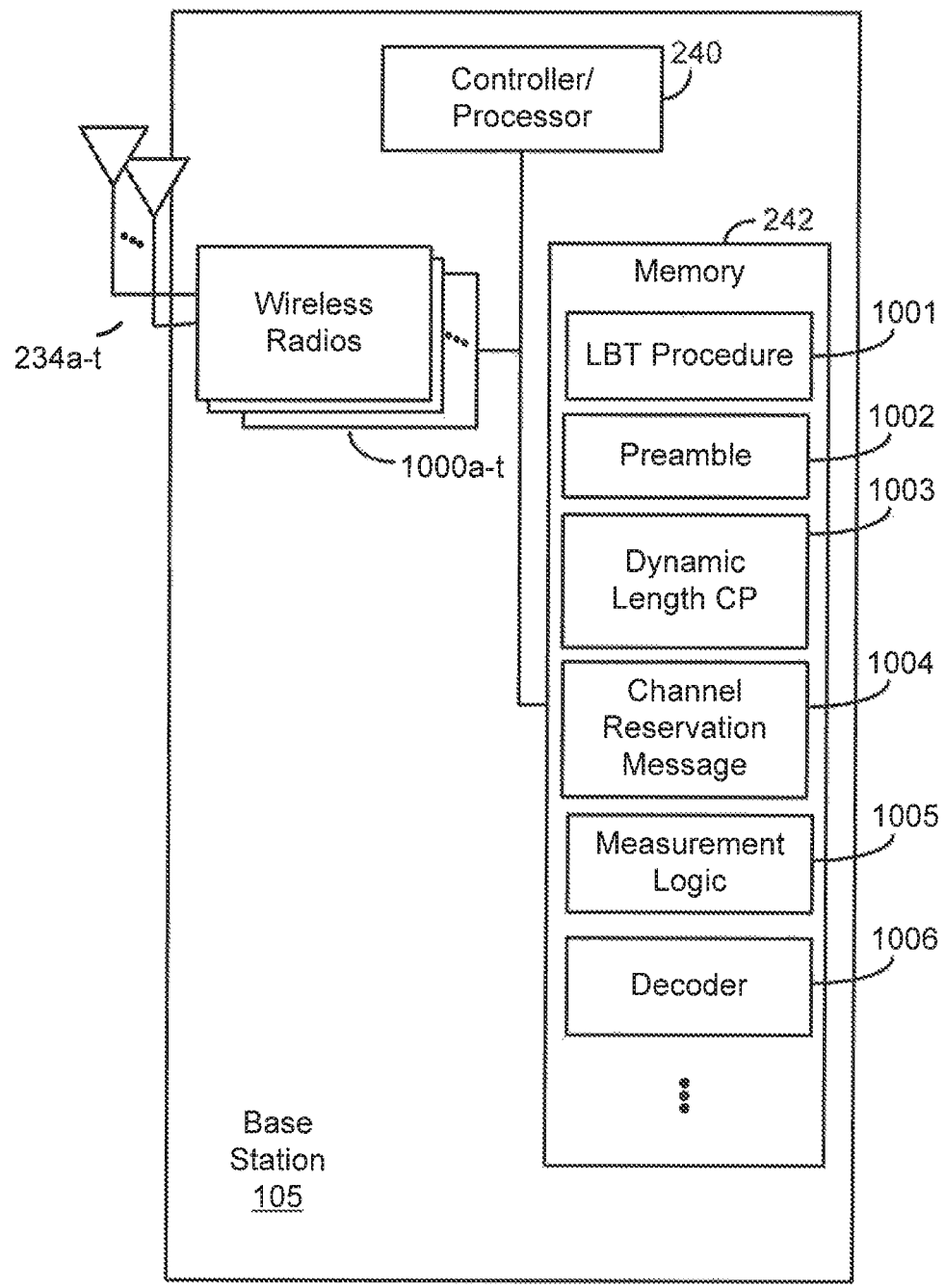
FIG. 10 is a block diagram illustrating an example base station configured according to aspects of the present disclosure.

FIG. 6A is a block diagram illustrating example blocks executed to implement aspects of the present disclosure for a transmitter. The example blocks will also be described with respect to base station 105 as illustrated in FIG. 10. FIG. 10 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1000a-t and antennas 234a-t. Wireless radios 1000a-t includes various components and hardware, as illustrated in FIG. 2 for base station 105, including modulator/demodulators 232a-t, MIMO detector 236, receive processor 238, transmit processor 220, and TX MIMO processor 230.

Figure 11:
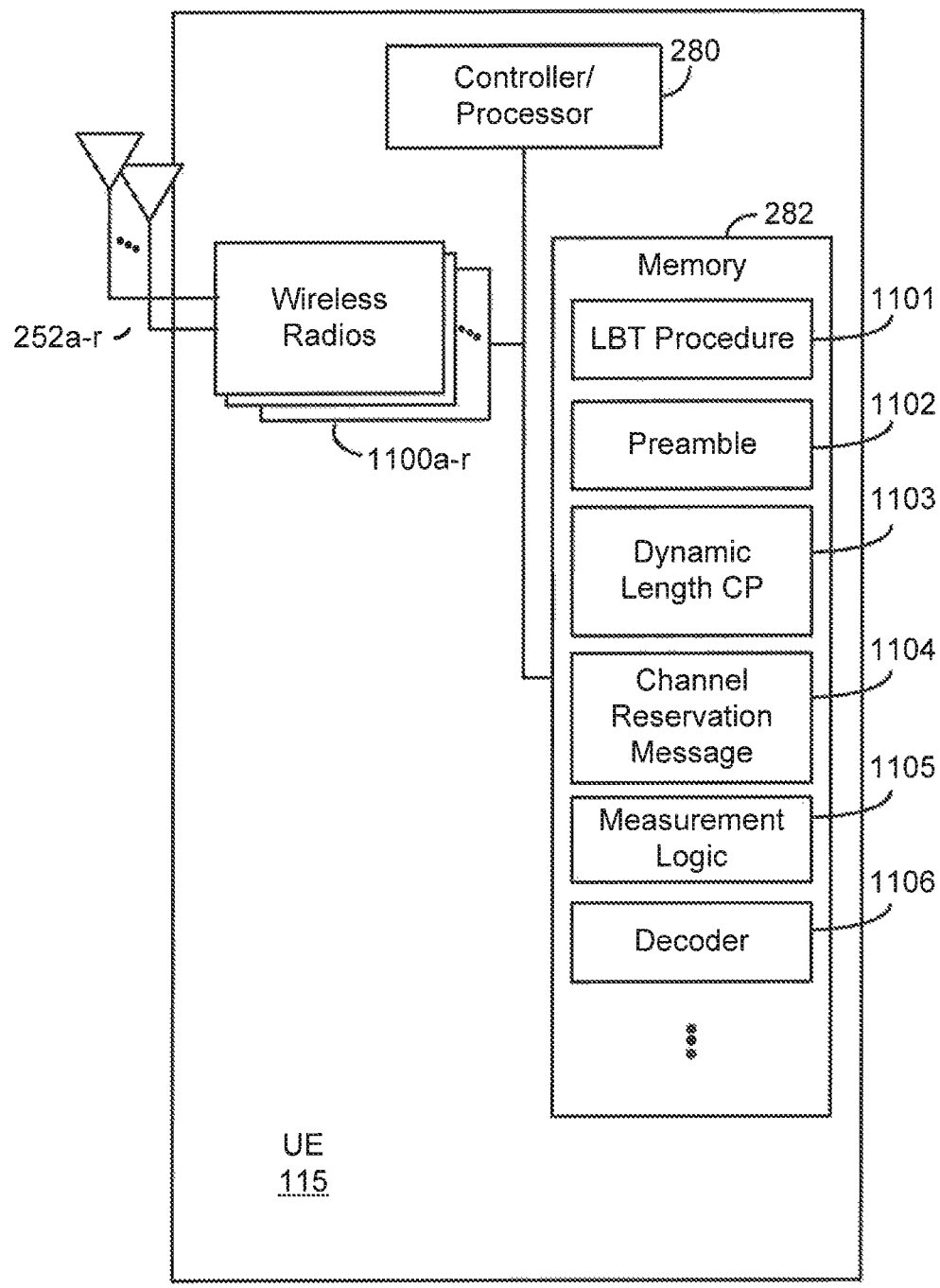
FIG. 11 is a block diagram illustrating an example UE configured according to aspects of the present disclosure.

The example blocks will also be described with respect to UE 115 as illustrated in FIG. 11. FIG. 11 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1100a-r and antennas 252a-r. Wireless radios 1100a-r includes various components and hardware, as illustrated in FIG. 2 for eNB 105, including modulator/demodulators 254a-r, MIMO detector 256, receive processor 258, transmit processor 264, and TX MIMO processor 266.

At block 600, a transmitter performs an LBT procedure on a transmission channel shared by one or more network nodes. The various network nodes may be asynchronous or synchronous with one another and may be from different network operators. The subject transmitter will perform the LBT procedure prior to attempting to reserve the channel. For example, a base station transmitter, base station 105, and a UE transmitter, UE 115, under control of controller/processor 240/280, respectively, executes LBT procedure 1001/1101, stored in memory 242/282. The execution environment of LBT procedure 1001/1101 allows the transmitter, base station 105 or UE 115, to perform an LBT check.

At block 601, the transmitter transmits a preamble in response to passing the LBT procedure. As soon as the transmitter passes the LBT, asynchronous transmission characteristics allow it to immediately transmit the preamble. However, the asynchronous preamble may generally be a fixed-length time domain sequence. Because the channel should be occupied as soon as possible after passing the LBT, the alignment of the OFDM symbol boundaries may not be synchronized with the preamble transmission. For example, the transmitter, base station 105 and UE 115, respectively, transmit preamble 1002/1102 via wireless radios 1000a-t/1100a-r and antennas 234a-t/252a-r, respectively.

At block 602, the transmitter transmits a dynamic length cyclic prefix after the preamble. As soon as the preamble has been transmitted, the transmitter will transmit the dynamic length cyclic prefix for the channel reservation message. Thus, the dynamic length cyclic prefix is a cyclic repetition of the channel reservation message symbol. For example, base station 105 or UE 115 transmit dynamic length cyclic prefix 1003/1103 via wireless radios 1000a-t/1100a-r and antennas 234a-t/252a-4, respectively. The length of the dynamic length cyclic prefix may be determined by the transmitter, base station 105 or UE 115, by computing the time from the end of the preamble until the next OFDM symbol boundary. This computed time is then added to the normal cyclic prefix length to create dynamic length cyclic prefix 1003/1103.

At block 603, the transmitter transmits the channel reservation message over a single OFDM signal after the dynamic length cyclic prefix. The dynamic length cyclic prefix serves to provide an alignment of the transmitter's transmissions with the OFDM symbol boundaries. Thus, synchronizing the transmissions beginning with the channel reservation message even though the transmission of the preamble is made in an asynchronous manner. For example, the transmitter, base station 105 or UE 115, transmit channel reservation message 1004/1104 via wireless radios 1000a-t/1100a-r and antennas 234a-t/252a-4, respectively.

FIG. 6B is a block diagram illustrating example blocks executed to implement aspects of the present disclosure for a detector or neighboring network node of a transmitter. At block 604, a detector monitors for a channel reservation preamble from one or more neighboring transmitters. When not currently transmitting, the detector will maintain observation of the shared spectrum. For example, as detectors, base station 105 or UE 115, under control of controller/processor 240/280, execute measurement logic 1005/1105, respectively, to detect the channel reservation preamble.

At block 605, the detector assumes a normal cyclic prefix of the channel reservation message after the channel reservation preamble in response to detecting the channel reservation preamble. When the detector, base station 105 or UE 115, detects the channel reservation preamble after the monitoring, it will assume that there is a normal cyclic prefix for the channel reservation message after the preamble. This assumption may adequately provide for the gap between the end of the preamble and the actual start of the channel reservation message, which would actually have begun after the normal cyclic prefix period. For example, under control of controller/processor 240/280, base station 105 or UE 115 may determine a normal cyclic prefix length after the preamble.

At block 606, the detector decodes a channel reservation message from a signal over a symbol length after the normal cyclic prefix. Because the actual channel reservation message will have been transmitted by the transmitter after a normal cyclic prefix, the signal from which the detector will attempt to decode the channel reservation message, will capture a cyclically shifted version of the channel reservation message in both the dynamic length cyclic prefix and the channel reservation message. However, the detector would still be able to recover the channel reservation message based on the captured cyclically shifted version. For example, the detector, base station 105 or UE 115, executes decoder logic 1006/1106, stored in memory 242/282, to decode the signal and receive channel reservation information.

Figure 7:
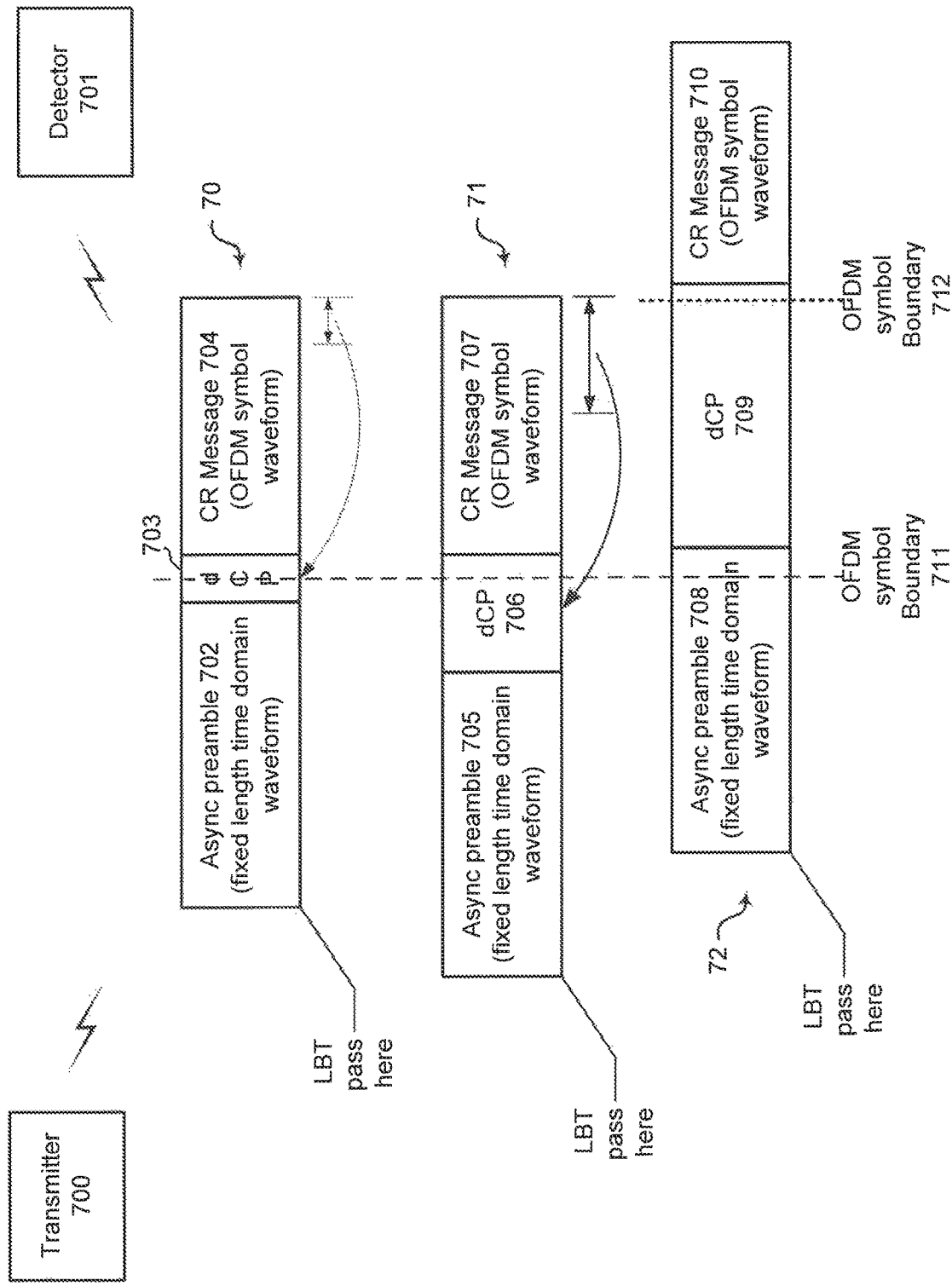
FIG. 7 is a block diagram illustrating a transmitter and detector configured according to one aspect of the present disclosure.

FIG. 7 is a block diagram illustrating a transmitter 700 and detector 701 configured according to one aspect of the present disclosure. Transmitter 700 makes three transmissions via transmission streams 70-72 according to the disclosed aspects. For transmission stream 70, transmitter 700 detects that the LBT procedure passes and transmits asynchronous preamble 702. Based on the time between the end of asynchronous preamble 702 and the next OFDM symbol boundary 711, transmitter 700 adds that time to the normal prefix to become dynamic length cyclic prefix (dCP) 703. As a result, the dynamic cyclic prefix length will be at least as long as the normal cyclic prefix length. Transmitter 700 transmits dynamic length cyclic prefix 703 after asynchronous preamble 702 and then transmits channel reservation message 704 as a synchronous OFDM symbol waveform. Detector 701, would detect asynchronous preamble 702 and assume that a normal cyclic prefix would follow before the expected channel reservation message. Detector 701 may then attempt to decode the expected channel reservation message from the cyclically shifted version of the expected channel reservation message detected as part of dynamic length cyclic prefix 703 and channel reservation message 704. Channel reservation message 704 has its own demodulation reference signal (DMRS) for demodulation, as it may not reuse the DMRS of asynchronous preamble 702. Detector 701 uses this DMRS to adjust the shifted version in order to decode channel reservation message 704.

In transmission stream 71, transmitter 700 sends asynchronous preamble 705 after detecting the LBT has passed. The end of asynchronous preamble 705 is further from OFDM symbol boundary 711 than in transmission stream 70, therefore, dynamic length cyclic prefix 706 will be longer than dynamic length cyclic prefix 703. Because of the asynchronous nature of asynchronous preambles 702 and 705, the dynamic length cyclic prefixes, dynamic length cyclic prefixes 703 and 706, are variable in length. Transmitter 700 may then transmit channel reservation message 707 after OFDM symbol boundary 711. Again, detector 701 begins attempting to decode the expected channel reservation message after a normal cyclic prefix period from the detected asynchronous preamble 705. Detector 701 would find the cyclic shifted version of channel reservation message 707 after the end of dynamic length cyclic prefix 706 and use the phase and timing information determined from the DMRS of channel reservation message 707 to decode.

In transmission stream 72, the passing of the LBT procedure is detected later in transmission stream 72 causing asynchronous preamble 708 to go just past OFDM symbol boundary 711. In computing dynamic length cyclic prefix 709, transmitter 700 adds the time between the end of asynchronous preamble 708 and the next OFDM symbol boundary 712 to the normal cyclic prefix length before sending channel reservation message 710. Channel reservation message 710 would then be transmitted after OFDM symbol boundary 712. Again, detector 701 begins attempting to decode the expected channel reservation message after a normal cyclic prefix period from the detected asynchronous preamble 708. Detector 701 would find the cyclic shifted version of channel reservation message 707 after the end of dynamic length cyclic prefix 709 and use the phase and timing information determined from the DMRS of channel reservation message 710 to decode.

Figure 8:
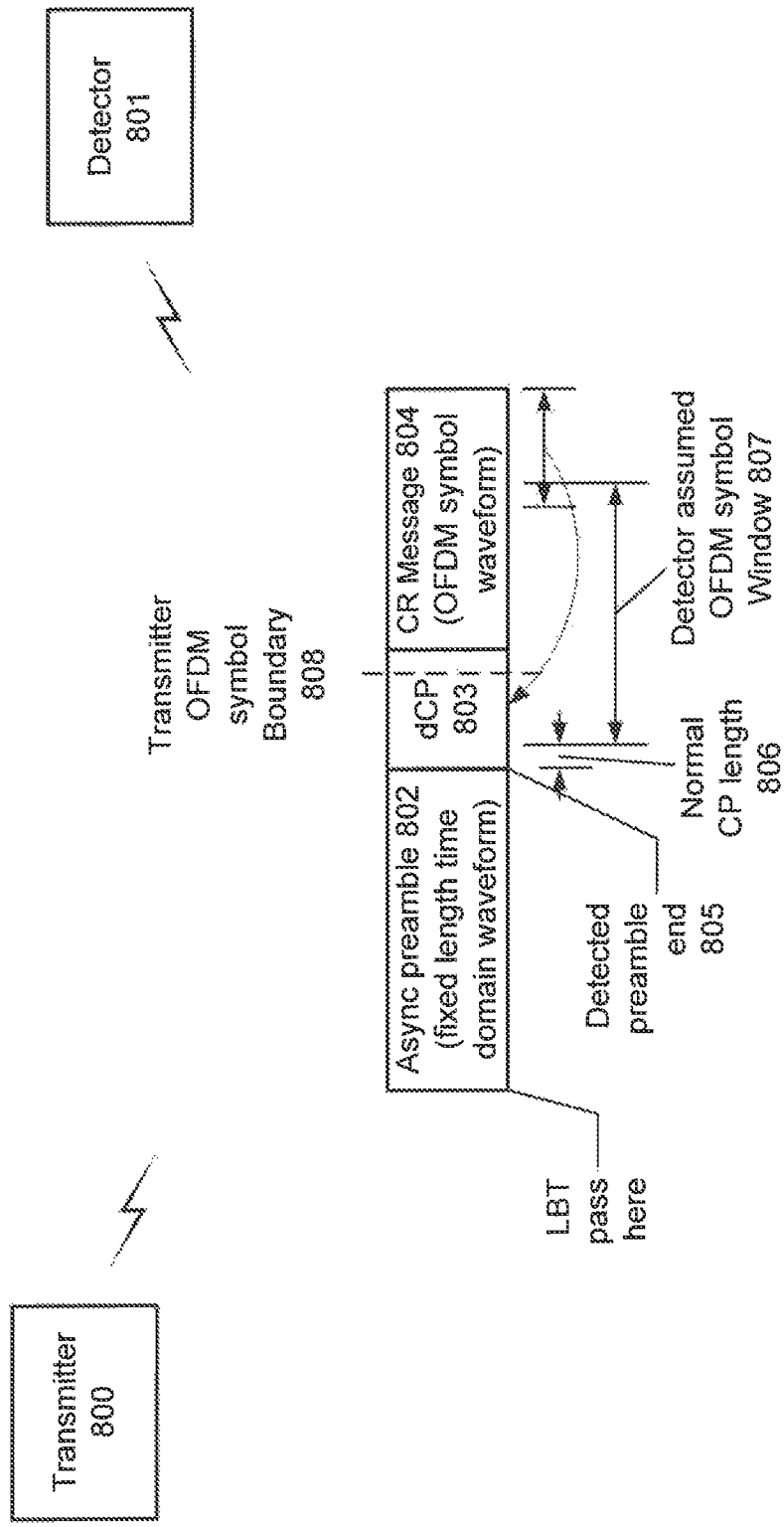
FIG. 8 is a block diagram illustrating a transmitter and a detector configured according to one aspect of the present disclosure.

FIG. 8 is a block diagram illustrating a transmitter 800 and a detector 801 configured according to one aspect of the present disclosure. Transmitter 800 detects the successful LBT and immediately transmits asynchronous preamble 802. Based on the period between the end of asynchronous preamble 802 and OFDM symbol boundary 808, transmitter 800 then transmits dynamic length cyclic prefix 803 which includes that period plus the normal cyclic prefix length. Transmitter 800 may then transmit channel reservation message 804.

Detector 801 may not have the same OFDM symbol boundary as transmitter 800. After detector 801 detects the preamble sequence of asynchronous preamble 802, detector 801 assumes a normal cyclic prefix length after which to detect and decode the expected channel reservation message of the OFDM symbol. The timing of detector's 801 detection and decoding starts from detected preamble end 805. Due dynamic length cyclic prefix 803 structure, the gap period of normal cyclic prefix 806 provides enough assumed OFDM symbol window 807 to detect at least a portion of the channel reservation message in both dynamic length cyclic prefix 803 and channel reservation message 804. That portion of dynamic length cyclic prefix 803 and channel reservation message 804 may be sufficient to decode and recover the channel reservation message information of the OFDM symbol. Assumed OFDM symbol window 807 will capture a cyclically shifted version of channel reservation message 804. Detector 801 as a receiver applies a Fourier transform to translate the time domain shift to a frequency domain phase ramp. Using the DMRS within the channel reservation message, detector 801 can estimate the phase ramp and determine a compensation to apply for decoding. As a result, detector 801 does not need to know the OFDM symbol timing of transmitter 800 in order to decode the channel reservation sequence of channel reservation message 804. Thus, as a byproduct of the channel reservation message DMRS based cyclic shift estimation, the OFDM symbol boundary of transmitter 800 can be recovered.

Figure 9:
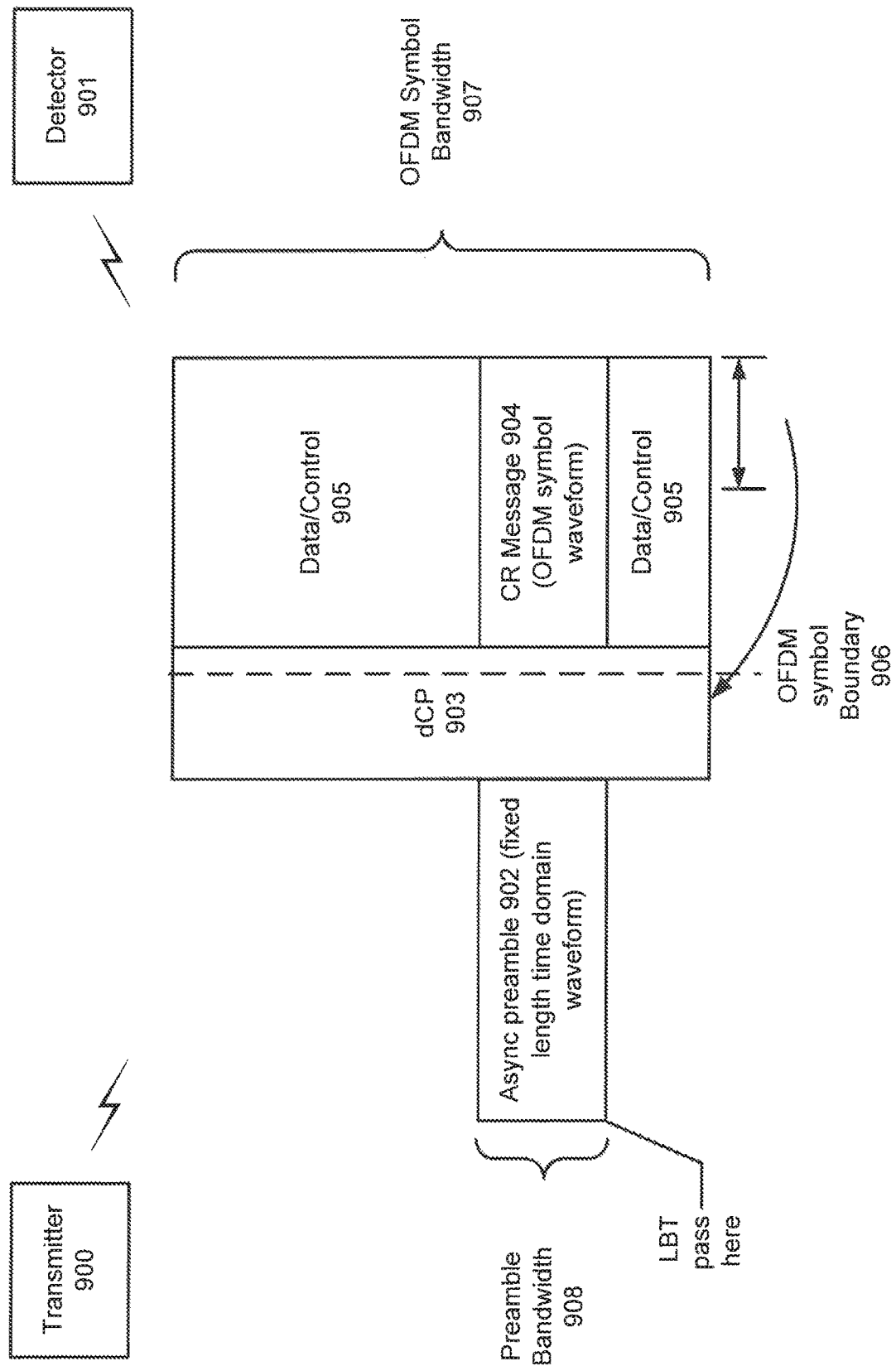
FIG. 9 is a block diagram illustrating a transmitter and a detector configured according to one aspect of the present disclosure.

FIG. 9 is a block diagram illustrating a transmitter 900 and a detector 901 configured according to one aspect of the present disclosure. Transmitter 900 transmits asynchronous preamble 902 followed by dynamic length cyclic prefix 903 and channel reservation message 904 according to the various aspects described herein. However, with channel reservation message 904 aligned to OFDM symbol boundary 906, it is possible to multiplex with other transmission in the same OFDM symbol. When OFDM symbol bandwidth is wider than preamble bandwidth 908, dynamic length cyclic prefix 903 is transmitted over the whole area of OFDM symbol bandwidth 907. In a simple frequency division multiplex (FDM) operation, channel reservation message 904 covers the same bandwidth as preamble bandwidth 908. The excess bandwidth of the difference between OFDM symbol bandwidth 907 and preamble bandwidth 908 may be used for data transmissions, data/control 905. Multiplexed transmission of data/control 905 are rate matched around the resource elements (REs) used by channel reservation message 904.

In an additional or alternative aspect, in which the next symbol is control symbol, multiplexing may occur at the control channel element (CCE) level. For example, channel reservation message 904 is transmitted using a specific set of CCEs, while data/control 905 use the remaining CCEs for PDCCH.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 6A and 6B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
performing, by a transmitter node, a listen before talk (LBT) procedure on a transmission channel shared by one or more synchronous or asynchronous network nodes;
transmitting, by the transmitter node, a fixed-length preamble in response to passing the LBT procedure;
transmitting, by the transmitter node, a dynamic length cyclic prefix after the preamble, wherein the dynamic length cyclic prefix includes a normal cyclic prefix plus a dynamic period; and
transmitting, by the transmitter node, a channel reservation message after the dynamic length cyclic prefix.

2. The method of claim 1, further including:
computing the dynamic period as a time length between an end point of the preamble and a next symbol boundary; and
adding the dynamic period to the normal cyclic prefix.

3. The method of claim 1, wherein the transmitting the channel reservation message includes:
- transmitting the channel reservation message according to a preamble bandwidth of the preamble; and
- multiplexing data transmissions with the channel reservation message in excess bandwidth around the preamble bandwidth, wherein the excess bandwidth includes a difference between a symbol bandwidth and the preamble bandwidth, wherein the data transmissions are rate matched according to the channel reservation message, and
- wherein the transmitting the dynamic length cyclic prefix transmits the dynamic length cyclic prefix across the symbol bandwidth.

4. The method of claim 1, wherein the transmitting the channel reservation message includes:
- transmitting the channel reservation message on a first set of control channel elements (CCEs) of a symbol bandwidth; and
- transmitting control signals using a second set of CCEs of the symbol bandwidth outside of the first set of CCEs.

5. The method of claim 1, wherein the transmitting the channel reservation message includes:
- transmitting a demodulation reference signal within a symbol of the channel reservation message.

6. A method of wireless communication, comprising:
- monitoring, by a network node, for a channel reservation fixed-length preamble from one or more neighboring transmitters;
- assuming, by the network node, a normal cyclic prefix after the channel reservation preamble in response to detection of the channel reservation preamble;
- decoding, by the network node, a signal over a symbol length after the normal cyclic prefix, wherein the decoding the signal is to decode a channel reservation message.

7. The method of claim 6, wherein the decoding the signal includes:
- using a demodulation reference signal within the signal to determine a frequency domain phase ramp of the signal;
- applying a compensation to the frequency domain phase ramp, wherein the compensation is based on a comparison of the frequency domain phase ramp with an estimated phase ramp based on the demodulation reference signal; and
- decoding the channel reservation message from the signal according to the compensation.

8. An apparatus configured for wireless communication, the apparatus comprising:
- at least one processor; and
- a memory coupled to the at least one processor,
- wherein the at least one processor is configured:
  - to perform, by a transmitter node, a listen before talk (LBT) procedure on a transmission channel shared by one or more synchronous or asynchronous network nodes;
  - to transmit, by the transmitter node, a fixed-length preamble in response to passing the LBT procedure;
  - to transmit, by the transmitter node, a dynamic length cyclic prefix after the preamble, wherein the dynamic length cyclic prefix includes a normal cyclic prefix plus a dynamic period; and
  - to transmit, by the transmitter node, a channel reservation message after the dynamic length cyclic prefix.

9. The apparatus of claim 8, further including configuration of the at least one processor:
- to compute the dynamic period as a time length between an end point of the preamble and a next symbol boundary; and
- to add the dynamic period to the normal cyclic prefix.

10. The apparatus of claim 8, wherein the configuration of the at least one processor to transmit the channel reservation message includes configuration of the at least one processor:
- to transmit the channel reservation message according to a preamble bandwidth of the preamble; and
- to multiplex data transmissions with the channel reservation message in excess bandwidth around the preamble bandwidth, wherein the excess bandwidth includes a difference between a symbol bandwidth and the preamble bandwidth, wherein the data transmissions are rate matched according to the channel reservation message, and
- wherein the configuration of the at least one processor to transmit the dynamic length cyclic prefix transmits the dynamic length cyclic prefix across the symbol bandwidth.

11. The apparatus of claim 8, wherein the configuration of the at least one processor to transmit the channel reservation message includes configuration of the at least one processor:
- to transmit the channel reservation message on a first set of control channel elements (CCEs) of a symbol bandwidth; and
- to transmit control signals using a second set of CCEs of the symbol bandwidth outside of the first set of CCEs.

12. The apparatus of claim 8, wherein the configuration of the at least one processor to transmit the channel reservation message includes configuration to transmit a demodulation reference signal within a symbol of the channel reservation message.

13. An apparatus configured for wireless communication, the apparatus comprising:
- at least one processor; and
- a memory coupled to the at least one processor,
- wherein the at least one processor is configured:
  - to monitor, by a network node, for a channel reservation fixed-length preamble from one or more neighboring transmitters;
  - to assume, by the network node, a normal cyclic prefix after the channel reservation preamble in response to detection of the channel reservation preamble;
  - to decode, by the network node, a signal over a symbol length after the normal cyclic prefix, wherein the program code executable by the computer for causing the computer to decode the signal is to decode a channel reservation message.

14. The apparatus of claim 13, wherein the configuration of the at least one processor to decode the signal includes configuration of the at least one processor:
- to use a demodulation reference signal within the signal to determine a frequency domain phase ramp of the signal;
- to apply a compensation to the frequency domain phase ramp, wherein the compensation is based on a comparison of the frequency domain phase ramp with an estimated phase ramp based on the demodulation reference signal; and
- to decode the channel reservation message from the signal according to the compensation.

* * * * *